Figure 1:
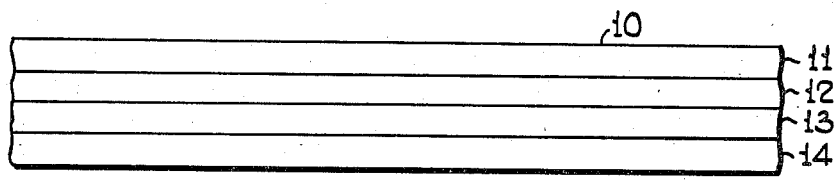

June 14, 1955   G. M. WEBSTER   2,710,661
METHOD OF COMPOSITING SEISMIC RECORDS
Filed Aug. 25, 1951   2 Sheets-Sheet 1

Gerald M. Webster Inventor
By W. O. Hilman Attorney

United States Patent Office 2,710,661
Patented June 14, 1955

2,710,661

METHOD OF COMPOSITING SEISMIC RECORDS

Gerald M. Webster, Tulsa, Okla., assignor to Esso Research and Engineering Company, a corporation of Delaware Application August 25, 1951, Serial No. 243,643

5 Claims. (Cl. 181—0.5)

The present invention relates to improvements in the art of determining the nature and position of subsurface geologic strata by seismic methods. In particular the invention is concerned with an improved method of compositing seismic records so as to emphasize detected reflections in order to render them more readily recognizable.

A method commonly employed in searching for likely oil or other mineral deposits is that known as seismic prospecting wherein a seismic disturbance is initiated at a selected point in or on the earth's surface as, for example, by detonating an explosive charge in a shot hole which causes seismic waves to travel through the earth and to be reflected from various substrata, the upward traveling reflected waves being detected at a number of points spread out in a desired pattern from the point of the initial seismic disturbance. Sensitive pick-ups, called seismometers or geophones, are arranged at the detection points to translate the detected motion into electrical impulses which after suitable amplification are recorded on a seismograph. The records may be in the form of waves or traces representative of the seismic waves that have been picked up by the individual geophones or they may be in the form of variable density or variable area records and in each case will be plotted as a function of time along the record, suitable timing marks being simultaneously made on the record so that when the same is later examined it will be possible to determine the length of time required for the arrival of the detected waves at any particular one of the detection points. From other data obtained in the area being studied, for example, seismic wave velocities in various earth layers, it is then possible to estimate the depth of the various substrata.

Although it is theoretically possible to time the arrival of a reflected seismic wave by the use of a single geophone and recording device, in practice it is usually difficult and sometimes impossible to pick out indicated reflected waves from a number of other earth vibrations that are detected and recorded at the same time. Therefore the usual practice is to employ a plurality of seismometers spread over a considerable distance along the earth's surface in a selected pattern as just described and to make a plurality of traces in side-by-side relation on a single chart for purposes of comparison, since a reflection from a well defined stratum will appear on the record as a wave form of increased amplitude on all of the traces in some definite time relation, thus permitting the reflection to be "lined up" on the record.

In order to increase the effectiveness of the records it has become frequent practice to use a plurality of geophones in each detection station all tied to one trace on the record. This practice has many advantages including the cancelling out of near-surface anomalies and emphasizing the detected reflection at the expense of extraneous signals. Another method often employed for enhancing the value of the seismic records is to use what is known as "mixing" or "compositing," in which a certain portion of the energy from one detection point is fed into the record for an adjacent detection point. This is usually accomplished by a suitable electrical connection within the amplifier and recording mechanism as, for example, by using mixer tubes or resistance networks. One suitable means for doing this is described in the Salvatori Patent 2,064,385.

In accordance with the present invention the benefits of mixing or compositing are obtained without physically tying the signals from adjacent detection points together in the amplifier. Instead the detected signals are recorded in the form of variable density records and adjacent traces on the record are transferred photographically to a second recording medium in a manner which involves overlapping adjacent traces so that true reflection events will be emphasized and random signals will be de-emphasized.

Figure 2:
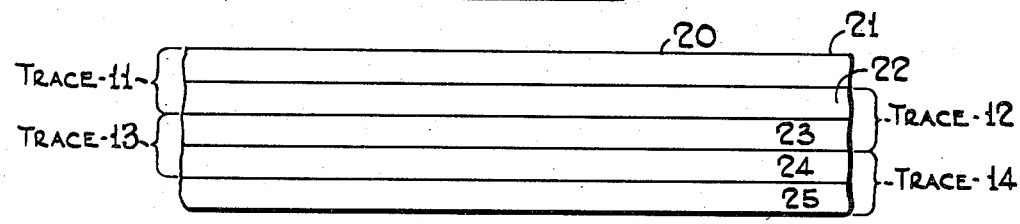
Figure 4:
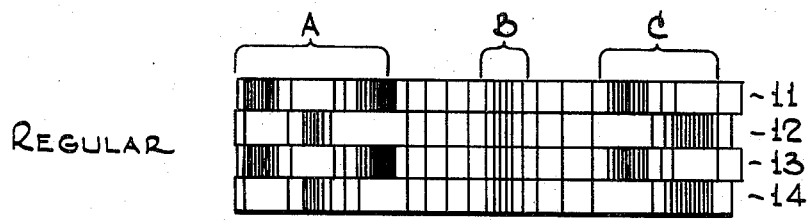
Figure 5:
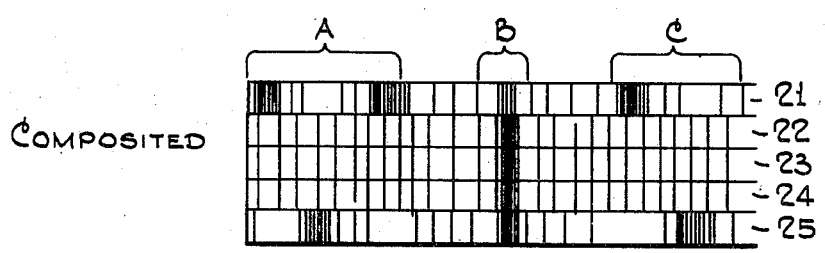
Figure 3:
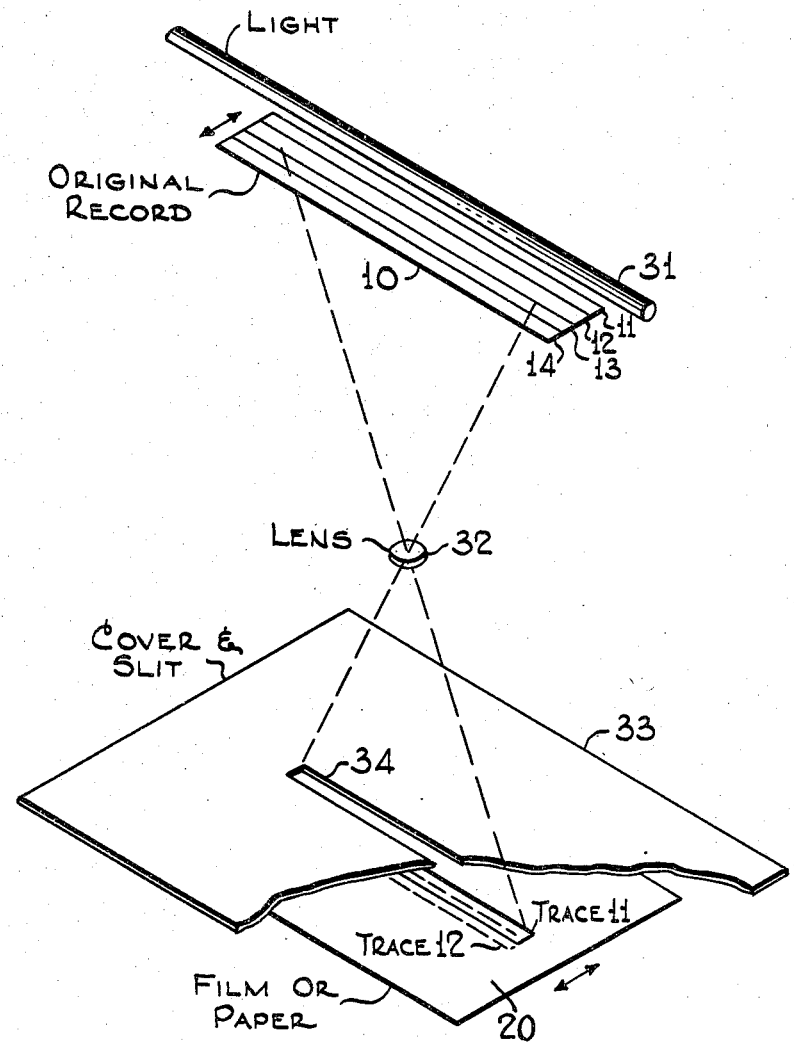

The nature and objects of the invention will be readily understood from the following description when taken in conjunction with the accompanying drawings in which Figure 1 is a schematic representation of four adjacent traces arranged in side-by-side relation, Figure 2 is a schematic representation illustrating how the four traces of Figure 1 will make up a five-trace composite record when the method of this invention is used, Figure 3 is a schematic diagram illustrating one method of compositing the records by photographic projection with a lens and slit arrangement, Figure 4 is a line drawing representing a variable density film seismic record, and Figure 5 is a line drawing of the resultant composited variable density recording obtained from the traces of Figure 4 by practicing this invention.

Referring now to Figure 1 this is simply a schematic diagram of a variable density film record 10 having four essentially straight line traces 11, 12, 13 and 14 arranged in side-by-side relation with respect to recording time on the film. These traces will be obtained from a spread of four detectors arranged in a selected pattern, usually an in-line pattern on the earth's surface at points removed from a shot point in accordance with well-known methods of seismic prospecting. These variable records may be made by the technique outlined in U. S. Patent 2,051,153 of Frank Rieber, for example. Each trace is of essentially uniform width throughout its length and consists of transverse striations of varying opacity in accordance with the signal recorded. In compositing these traces by the method of the present invention trace 11 will be transferred photographically to a second photographic medium, which may be either film or paper, by either direct contact printing or by projection printing in such a manner that it will comprise trace 21 in Figure 2 as well as a component of trace 22. In the same manner trace 12 will be transferred to record medium 20 in Figure 2 to comprise components of traces 22 and 23. Likewise trace 23 will have as its other component trace 13, trace 24 will have components of traces 13 and 14 and trace 25 will comprise a reprinting of trace 14.

One manner in which this may be accomplished is illustrated in Figure 3. The record 10 is projected by means of light source 31 through lens 32 onto recording medium 20. An opaque cover 33 having a longitudinal slit 34 of a proper size for the final record is placed over recording medium 20 to permit the printing of the traces individually. Referring again to Figure 2 the compositing may be done in one of two ways. In one method slit 34 may be of sufficient width that when trace 11 is projected it will cover the area represented by traces 21 and 22 in Figure 2 and then recording medium 20 will be moved laterally so that when trace 12 is projected it will cover the areas represented by traces 22 and 23, etc. In the alternative method slit 34 is made to have a width corresponding to the individual traces 21, 22, etc. and trace 11 is projected first into the area represented by trace 21 after which trace 11 is projected into the area represented by trace 22, then trace 12 is projected into the area represented by trace 22. Recording medium 20 is again moved laterally and trace 12 is projected into the area represented by trace 23, etc, until all five traces have been printed. By employing twice the exposure time when printing trace 11 as trace 21 and when printing trace 14 as trace 25, as when printing the separate components of the intermediate traces, the same total exposure time will be used across the composited record, thus making for uniformity in exposure of the final print.

Figures 4 and 5 are line drawings illustrating typical four-trace variable density records before and after compositing. It will be noted that in Figure 4 the shaded portion in section B is less opaque than the shaded portions of sections A and C whereas in the composite records of Figure 5 section B has become emphasized whereas sections A and C have become de-emphasized because the alternate dense and light areas in sections A and C tend to produce an overall uniform density and thus the true reflection in section B is brought out more clearly in the composited record.

Although only four original traces are shown in the examples it is to be understood that it is the usual practice in seismic prospecting to have a spread of detectors that will give a record for 12 or 16 or as many as 24 traces. A relatively small number of traces has been represented in the drawing merely for the purpose of illustrating the invention.

The method of this invention may also be applied in the making of a seismic profile by compositing the last trace of one record with the first trace of a second record made with a second spread of geophones and a second shot point arranged along a selected traverse, it being essential of course that the traces be properly lined up with respect to the "zero" time line, and that the two records be made at the same recording speed, i. e., the time lines on the two records should be the same distance apart.

It is not intended that this invention be limited by the specific illustrations presented above, which are given by way of example. The true scope of the invention is defined in the appended claims.

What is claimed is:

1. In seismic prospecting wherein a seismic disturbance is initiated adjacent the surface of the earth to generate seismic waves travelling generally downward to be reflected upward by underlying strata and the upward travelling waves are detected at a plurality of points arranged in a selected pattern with respect to the point of initial seismic disturbance, the improved method of recording the detected waves which comprises converting the detected waves into photographic records in which signal variations are recorded as essentially straight line traces having essentially uniform width throughout their length, the traces comprising transverse striations of varying opacity arranged longitudinally in time relation, the signals from adjacent detection points being arranged in side-by-side relation with respect to time on said record, and photographically transferring said records to a second photographic medium a trace at a time, a first selected trace transferred to a selected area of said photographic medium, a second adjacent trace being transferred to a second selected area, said second area laterally overlapping a preselected portion of said first area, a third trace adjacent said second trace being transferred to a third selected area overlapping said second area in the same manner, and repeating the transferring steps for all remaining traces on the record each of said areas being of essentially uniform width throughout its length, said areas being substantially parallel to each other.

2. The method of compositing seismic prospecting records of the variable density type wherein traces from adjacent geophones in a selected pattern spread have been recorded as traces of essentially uniform width arranged in side-by-side relation with respect to time which comprises photographically transferring a first selected trace to a selected area of a photographic medium, transferring a second adjacent trace to a second selected area of the photographic medium, said second area laterally overlapping said first area by a preselected amount, transferring a third trace, adjacent said second trace, to a third selected area which laterally overlaps said second area, and repeating the steps for each trace of the record, each of said areas being of essentially uniform width throughout its length, said areas being substantially parallel to each other.

3. Method according to claim 2 in which said photographic transferring step is conducted by phtographic projection, said first trace being projected entirely into said first selected area, said second trace being projected entirely into said second selected area, and so on for each of said traces.

4. Method according to claim 2 in which said photographic transferring step is conducted by transferring said first trace into the non-overlapped portion of said first selected area, then transferring said first trace into the portion of said first area that is overlapped by said second area, then transferring said second trace into said last named overlapped area, then transferring said second trace into the portion of said second area that is overlapped by said third area, and repeating said separate transfers to individual overlapped areas for each trace of the record, finally transferring the last trace to the non-overlapped portion of the last selected area.

5. Method according to claim 4 in which the exposure time in transferring the first trace and the last trace to their respective nonoverlapped portions of the first and last selected areas is twice that for transferring the several traces to the respective overlapped areas, whereby uniformity in overall exposure in the final transferred record is obtained.

References Cited in the file of this patent

UNITED STATES PATENTS

| | | |
|---|---|---|
| 1,923,746 | Pomeroy | Aug. 22, 1933 |
| 2,263,316 | Ryan | Nov. 18, 1941 |
| 2,519,194 | Maurer, Jr. | Aug. 15, 1950 |
| 2,604,955 | Hawkins | July 29, 1952 |